United States Patent
Sharma et al.

(10) Patent No.: US 9,996,655 B2
(45) Date of Patent: Jun. 12, 2018

(54) SKELETON I/O GENERATION FOR EARLY ESD ANALYSIS

(71) Applicant: SanDisk Technologies LLC, Plano, TX (US)

(72) Inventors: Anand Sharma, Bangalore (IN); Shiv Harit Mathur, Bangalore (IN); Rajeswara Rao Bandaru, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 0 days. days.

(21) Appl. No.: 15/172,974

(22) Filed: Jun. 3, 2016

(65) Prior Publication Data

US 2017/0255741 A1    Sep. 7, 2017

Related U.S. Application Data

(60) Provisional application No. 62/303,748, filed on Mar. 4, 2016.

(51) Int. Cl.
*G06F 9/455* (2018.01)
*G06F 17/50* (2006.01)
*H01L 27/02* (2006.01)

(52) U.S. Cl.
CPC ...... *G06F 17/5081* (2013.01); *G06F 17/5072* (2013.01); *H01L 27/0248* (2013.01); *G06F 2217/70* (2013.01)

(58) Field of Classification Search
CPC ............. G06F 17/5081; G06F 17/5072; G06F 2217/70; G06F 17/5068; G06F 2217/12; H02H 9/04; H01L 27/0248
See application file for complete search history.

(56) References Cited

U.S. PATENT DOCUMENTS

| 2004/0243949 | A1* | 12/2004 | Wang ................. G06F 17/5081 716/112 |
| 2007/0165344 | A1* | 7/2007 | Esmark ............... G06F 17/5036 361/56 |
| 2007/0277138 | A1 | 11/2007 | Lai et al. |
| 2013/0155555 | A1 | 6/2013 | Blanc et al. |
| 2014/0013296 | A1 | 1/2014 | Hayashi |
| 2014/0189616 | A1* | 7/2014 | Rieger ................ G06F 17/5068 716/55 |
| 2015/0310155 | A1* | 10/2015 | Banerjee ............. G06F 17/5081 716/53 |

FOREIGN PATENT DOCUMENTS

EP    2 693 351 A1    2/2014

\* cited by examiner

*Primary Examiner* — Nha Nguyen
(74) *Attorney, Agent, or Firm* — Brinks Gilson & Lione

(57) ABSTRACT

A design flow of an integrated circuit may include a skeleton input/output (I/O) generation stage during which information about ESD protection circuitry and rails but not functional circuitry of the I/O cells of the integrated circuit is generated. The information may be used in an ESD analysis stage to generate performance characteristics of the ESD protection circuitry. Results of the ESD analysis may then be used to design optimized ESD protection circuitry along with the rest of the circuit components of the I/O cells. In this way, the design of ESD protection circuitry may be optimized without having to redo a completed I/O cell design and significantly delay the design flow before tapeout.

14 Claims, 4 Drawing Sheets

SKELETON I/O GENERATION FOR EARLY ESD ANALYSIS

CROSS-REFERENCE TO RELATED APPLICATIONS

This application claims the benefit of U.S. Provisional Application No. 62/303,748, filed on Mar. 4, 2016. The contents of U.S. Provisional Application No. 62/303,748 are incorporated by reference in their entirety.

BACKGROUND

The design flow of an integrated circuit (IC) includes several stages. One of the stages is an electrostatic discharge (ESD) analysis stage, during which simulation of ESD circuitry of the integrated circuit is performed. Typically, the ESD analysis stage occurs toward the end of the design flow, after the circuit schematic and physical layout designs of the entire integrated circuit are finished and right before tapeout. It is performed toward the end because it uses the layout of the IC to perform the analysis.

The ESD analysis stage may determine ESD performance characteristics of the ESD circuitry. Because the ESD analysis stage is performed toward the end of the design flow, then if the ESD analysis stage identifies ESD performance characteristics that are unsatisfactory, redesign of the IC in order to improve ESD performance characteristics may set back the design flow schedule on the order of months. Alternatively, risk with regard to ESD performance and robustness is assumed if the schedule cannot be delayed. In order to guard against the undesirable effects of the ESD analysis stage identifying unsatisfactory performance characteristics, the ESD circuitry may be designed with a large amount of pessimism, meaning that the ESD circuitry may be over designed or designed with extra margin, such as by designing it with extra area or with extra rails in order to aim for a lower than expected rail or path resistance. Accordingly, it may be desirable to implement a design flow that allows for optimizing the design of the ESD circuitry without disrupting the design flow schedule.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION OF PRESENTLY PREFERRED EMBODIMENTS

Overview

Figure 2:
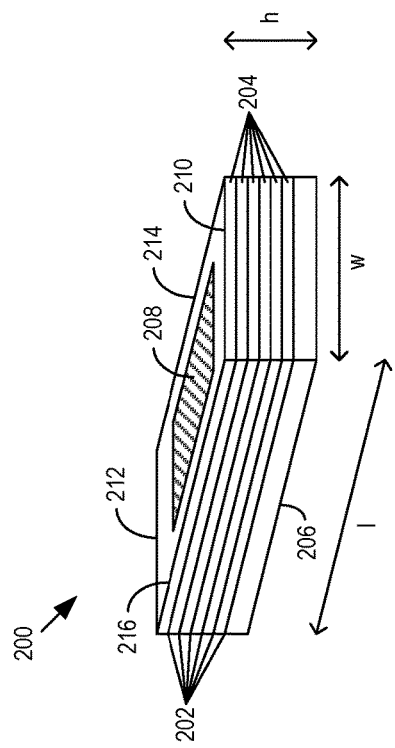
FIG. 2 is a perspective view of an example input/output (I/O) cell, showing multiple metal layers of the I/O cell.

The following embodiments describe early implementation an ESD analysis stage into an overall design flow of an integrated circuit. In a first embodiment, a method includes: generating, with a first computing device, data that identifies electrostatic discharge (ESD) protection circuitry and rails of a plurality of input/output (I/O) cells but not functional circuitry of the I/O cells of an integrated circuit; and generating, with a second computing device, at least one performance characteristic of the ESD circuitry based on the data.

In another embodiment, a method comprises: generating, with a first computing device, a data file for a plurality of I/O cells of an integrated circuit, wherein the data file excludes information of functional circuitry of the plurality of I/O cells; analyzing, with a second computing device executing electrostatic discharge (ESD) analysis software, the data file; and based on the analysis, generating, with the second computing device executing the ESD analysis software, at least one performance characteristic of ESD circuitry of the integrated circuit.

In some example embodiments, the data comprises data that identifies a layout of the ESD circuitry and the rails.

In some example embodiments, the data identifying the layout is formatted according to a Graphic Database System (GDS) format.

In some example embodiments, the at least one performance characteristic includes a resistance of a discharge path associated with the ESD circuitry.

In some example embodiments, the plurality of I/O cells are part of an I/O pad ring of the integrated circuit.

In some example embodiments, the method further includes: inputting the data to ESD analysis software being executed by the second computing device, where generating the at least one performance characteristics includes generating, with the second computing device executing the ESD analysis software, the at least one performance characteristic in response to inputting the data to the ESD analysis software.

In some example embodiments, the first computing device and the second computing device are the same computing device.

In some example embodiments, the first computing device and the second computing device are different computing devices.

Other embodiments are possible, and each of the embodiments can be used alone or together in combination. Accordingly, various embodiments will now be described with reference to the attached drawings.

Exemplary Embodiments

As mentioned in the background section, performing electrostatic discharge (ESD) analysis of ESD protection circuitry toward the end of a design flow of an integrated circuit may result in one or more of the following: over-design of the ESD protection circuitry, setback in the design flow schedule in order to redesign the ESD protection circuitry, or an assumption of risk in terms of ESD performance and robustness. The following embodiments describe implementing an ESD analysis stage into an overall design flow of an integrated circuit such that design of the ESD protection circuitry may be optimized without having to disrupt the timeline or schedule of the design flow. Before turning to these and other embodiments, the following paragraphs provide a discussion of an exemplary integrated circuit and associated components that can be used with these embodiments. Of course, these are just examples and other suitable types of integrated circuits can be used.

Figure 1:
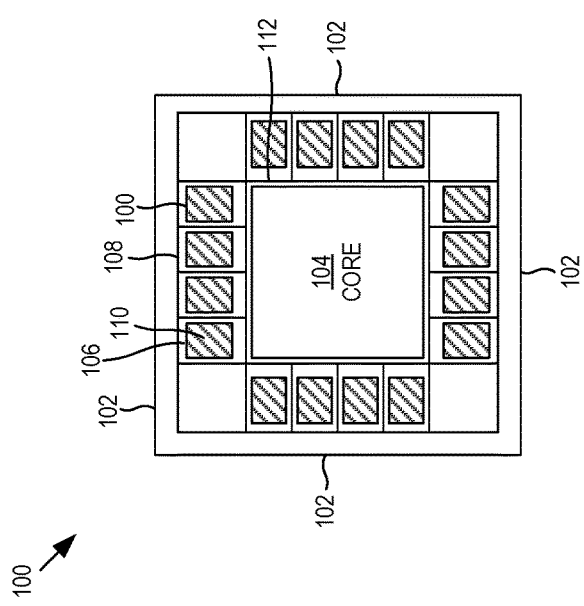
FIG. 1 is a top view of an example integrated circuit.

FIG. 1 is a top view of an example integrated circuit (IC) 100. An example integrated circuit 100 may be a system on a chip (SOC), although other IC types may be possible. The integrated circuit 100 may include IC or chip edges 102 that define an outer boundary of the integrated circuit 100. The integrated circuit 100 may also include a core 104, which may include digital logic circuitry or other similar circuitry, and be configured to perform various functions of the integrated circuit 100. For example, in memory applications, the core 104 may be configured to perform memory management functions, such as execute host read and write commands for example.

In addition, the integrated circuit 100 may include I/O cells 106 for communication between the core 104 and electronic devices external the integrated circuit 100. Each of the I/O cells 106 may be of one of a plurality of different cell types. Three I/O cell types include: a signal I/O cell, a power I/O cell, or a ground I/O cell. Other cell types for the integrated circuit 100 may be possible. A signal I/O cell may be configured to communicate signals carrying data or other information to and from the core 104. As non-limiting examples, for memory applications, the signals may carry data that a host device wants read from or written to memory, or command information associated with the reading or writing of data. A power I/O cell may supply a supply voltage to the core 104 and/or circuit components of the I/O cells 106. A ground I/O cell may provide a ground reference voltage for the core 104 and/or the circuit components of the I/O cells 106. For simplicity, and unless otherwise specified, a power I/O cell and a ground I/O cell are collectively referred to as a power/ground I/O cell.

Additionally, each I/O cell 106 may include an external connection 108 that is configured to provide the connection for the signal, supply voltage, or ground reference voltage between the circuit components of the I/O cell 106 and the contact pins or other connection points of the packaging of the integrated circuit 100 (not shown). The example integrated circuit configuration shown in FIG. 1 shows the external connection as being a bond pad, although other types of external connections, such as flip chip external connections or cluster connections, may be used as the external connections for the I/O cells 106. Accordingly, the I/O cells described herein are not to be limited to only those I/O cells that use bond pads for the external connections.

In some example configurations, as shown in FIG. 1, the I/O cells 106 may be adjacent to each other and form a ring, which may be referred to as an I/O pad ring, around the core 104. I/O cell topologies other than that shown in FIG. 1 may be possible, including those in which the I/O cells 106 are not adjacent to each other and/or do not form a complete ring around the core 104.

FIG. 2 shows a perspective view of an I/O cell 200, which may be representative of one of the I/O cells 106 of the integrated circuit 100 of FIG. 1. For purposes of the present description, the I/O cell 200 may be a three-dimensional structure, such as a rectangular prism, having a length l, a width w, and a height h. The length l may extend from an I/O cell edge 210 corresponding or closest to the chip edge and an opposing I/O cell edge 212 corresponding or closest to the core. The width w may be defined by outer lateral edges 214, 216, which identify or demarcate the boundaries between adjacent I/O cells. The height h may extend from a base or substrate portion 206 of the I/O cell 200 to a top metal (or other) layer of the I/O cell 200.

The I/O cell 200 may include a plurality of metal layers 202 separated or isolated by dielectric layers 204. The metal layers 202 may be generally planar structures that are aligned with and oriented parallel to each other. The further away from the base or substrate portion 206 of the I/O cell 200 a metal layer is, the higher that metal layer is considered or identified. For example, if an I/O cell 200 has N metal layers, then the Nth layer is the top layer furthest away from the base 206. Also, the metal layers 202 may generally extend uniformly across the different I/O cells of the integrated circuit, such that each of the I/O cells have the same number of metal layers, and the ith metal layer of one I/O cell is co-planar with the ith metal layer of another I/O cell.

Metal connections that interconnect circuit components of the I/O cell 200 or provide supply or ground reference voltages to circuit components of the I/O cell 200 may be formed in the metal layers 202. In addition, metal connections in different layers may be connected to each other with vias. A metal connection in a metal layer may be considered to extend laterally and/or be referred to as a lateral metal connection if it extends generally parallel with the width w of the I/O cell 200, from one lateral I/O cell edge 214 to the other lateral I/O cell edge 216. A metal connection in a metal layer may be considered to extend vertically and/or be referred to as a vertical metal connection if it extends generally parallel with the length l of the I/O cell 200, from the I/O cell edge 210 to the opposing I/O cell edge 212. Also, a metal connection that provides a supply voltage may be referred to as a supply or power rail, and a metal connection that provides a ground reference voltage may be referred to as a ground rail. Hereafter, for simplicity and unless otherwise specified, supply or power rails and ground rails are referred to collectively as "rails," where the term "rail" may refer to either a supply rail or a ground rail. In addition, for some example configurations of an I/O cell 200, an external connection 208, such as a bond pad as shown in FIG. 2, may be disposed in a top M-number of the metal layers 202, where M is one or more.

Figure 3:
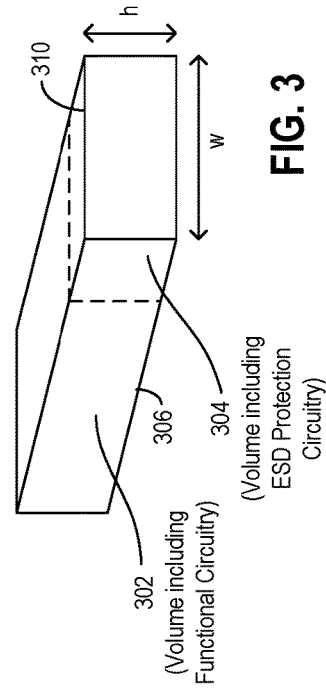
FIG. 3 is another perspective view of an example I/O cell, showing different volumes of the I/O cell where functional and electrostatic discharge (ESD) protection circuitries are located.

FIG. 3 shows a perspective view of a signal I/O cell 300, which may be representative of a signal I/O cell of the integrated circuit of FIG. 1. Although not shown for clarity, the signal I/O cell 300 may also include a plurality of metal layers and an external connection, such as those shown and described with reference to FIG. 2.

The signal I/O cell 300 may include two separate volumes 302, 304, each extending a height h of the I/O cell 300 from a base or substrate 306 to a top layer of the I/O cell 300 and a width w of the I/O cell 300. The first volume 302 may include or have disposed therein functional circuitry of the I/O cell 300. Example functional circuitry may include circuitry that is used to communicate a signal between the core 104 and the bond pad 308. Example functional circuitry may include: driver and pre-driver circuitry configured to increase or decrease the drive current of the signal for capacitive load purposes and level shifter circuitry configured to up-shift or down-shift the voltage of the signal between voltage domains, such as a voltage domain in which the core 104 operates and a voltage domain in which signals are communicated between the integrated circuit 100 and an external (host) device. Other functional circuitry may also be included. The second volume 304 may include electrostatic discharge (ESD) protection circuitry used to discharge current generated from an ESD event in order to suppress an ESD voltage.

An I/O edge 310 corresponding to the chip edge of the integrated circuit may be an outer boundary of the second volume 304. That is, length wise, the ESD protection circuitry may be disposed in the signal I/O cell 300 closer to the chip edge than the functional circuitry, while the functional circuitry may be disposed in the I/O cell 300 closer to the core 104 than the ESD protection circuitry. The bond pad 308 may be disposed above the functional circuitry in the first volume 302 and/or the ESD protection circuitry disposed in the second volume 304.

A power/ground I/O cell may be similar to the signal I/O cell, such as the one shown in FIG. 3, in that its ESD protection circuitry may be disposed in a volume closest to the chip edge. However, a power/ground I/O cell may not include functional circuitry for communication of a signal.

Figure 4:
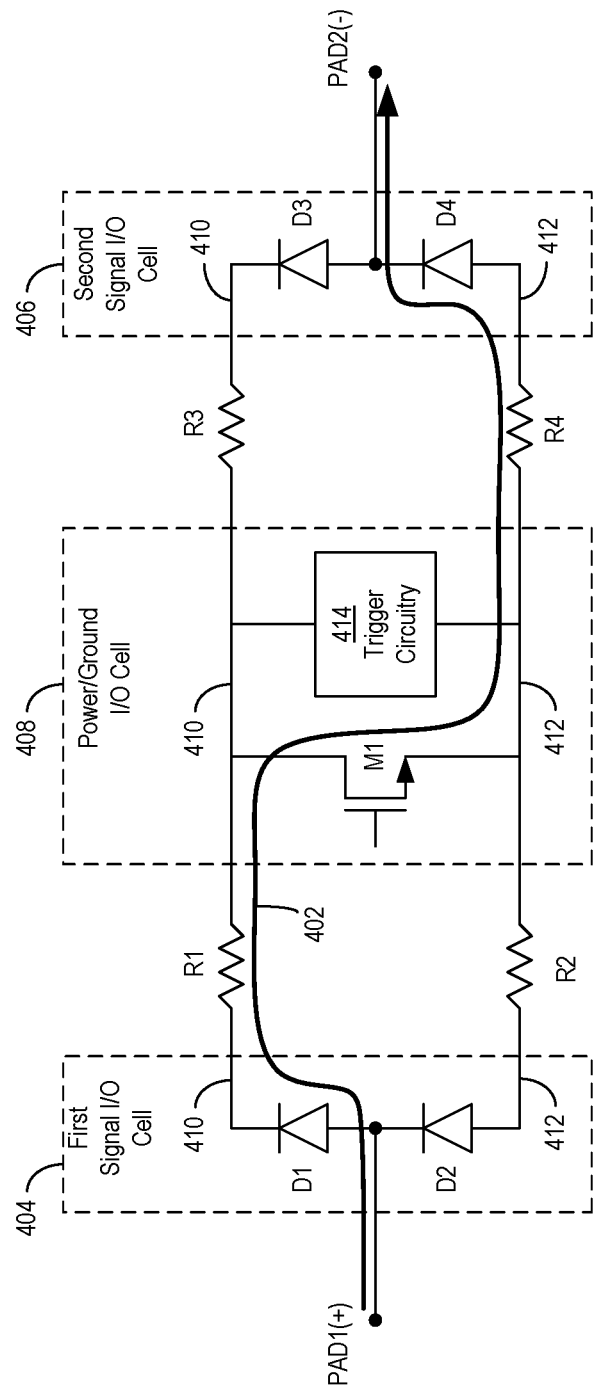
FIG. 4 is a circuit schematic of example ESD protection circuitry used to discharge current in response to an ESD event.

FIG. 4 shows a circuit schematic of example ESD protection circuitry used to discharge current in response to an ESD event. The ESD event may occur on a first external connection, such as a first bond pad, of a first signal I/O cell, denoted as PAD1(+) in FIG. 4. The ESD protection circuitry is configured such that charge accumulated on the first external connection PAD1(+) is discharged to a second external connection, such a second bond pad, of a second signal I/O cell, denoted as PAD2(−) in FIG. 4. The plus sign "+" and minus sign "−" are used to denote that when the ESD event occurs, the voltage on the first external connection PAD1(+) (also referred to as a zap node) is positive with respect to the voltage on the second external connection PAD2(−) (also referred to as a reference node).

In order to discharge current resulting from the ESD event, a discharge path denoted by arrow 402, may be created through ESD protection circuitry disposed in three I/O cells, including a first signal I/O cell 404 that includes the first external connection PAD1(+) on which the ESD event occurred, a second signal I/O cell 406 that includes the second external connection pad PAD2(−) to which the ESD current is discharged, and a power/ground I/O cell 408.

The ESD protection circuitry included in signal I/O cells may include two ESD diodes, which may be p-n diodes. One of the two ESD diodes may have its anode end connected to the bond pad and its cathode end connected to a power rail 410. The other ESD diode may have its cathode end connected to the bond pad and its anode end connected to a ground rail 412. Accordingly, as shown in FIG. 4, the ESD protection circuitry of the first signal I/O cell 404 may include a first diode D1 with its anode connected to the first external connection PAD1(+) and its cathode connected to the power rail 410, and a second diode D2 with its cathode end connected to the first external connection PAD1(+) and its anode end connected to the ground rail 412. Similarly, the ESD protection circuitry of the second signal I/O cell 406 may include a third diode D3 with its anode connected to the second external connection PAD2(−) and its cathode connected to the power rail 410, and a fourth diode D4 with its cathode end connected to the second external connection PAD2(−) and its anode end connected to the ground rail 412.

The ESD protection circuitry of the power/ground I/O cell 408 may include a clamp transistor M1 that clamps the power rail 410 to the ground rail 412 so that the ESD current may discharge from the power rail 410 to the ground rail 412 when an ESD event occurs. That is, when an ESD event occurs, the clamp transistor M1 may turn on, allowing the ESD current to flow from the power rail 410 to the ground rail 412 via the clamp transistor M1. The ESD protection circuitry of the power/ground I/O cell 408 may also include trigger circuitry 414, which may be configured to detect the ESD event and turn on the clamp transistor M1 in response to the detection. Example circuit components for the trigger circuitry 414 may include resistor-capacitor (RC) circuitry. A diode connected in parallel with the clamp transistor M1 may also be included in the trigger circuitry 414. Other or additional circuitry used for the trigger circuitry 414 to turn on and off the clamp transistor M1 may be possible.

Physically, the power rail 410 and the ground rail 412 may each include one or more lateral metal connections in one or more metal layers. Where multiple lateral connections in multiple metal layers are used, the power rail 410 and/or ground rail 412 may include one or more vias to connect the multiple lateral connections in the multiple layers.

Additionally, the power rail 410 and the ground rail 412 may each include rail resistance in between the ESD protection circuitry of the first and second signal I/O cells 404, 406 and the ESD protection circuitry of the power/ground I/O cell 408. In particular, a portion of the power rail 410 in between the cathode end of first ESD diode D1 and the ESD protection circuitry of the power/ground I/O cell 408 connected to the power rail 410 may include a first rail resistance represented by a first resistor R1; a portion of the ground rail 412 in between the anode end of second ESD diode D2 and the ESD protection circuitry of the power/ground I/O cell 408 connected to the ground rail 412 may include a second rail resistance represented by a second resistor R2; a portion of the power rail 410 in between the cathode end of third ESD diode D3 and the ESD protection circuitry of the power/ground I/O cell 408 connected to the power rail 410 may include a third rail resistance represented by a third resistor R3; and a portion of the ground rail 412 in between the anode end of fourth ESD diode D4 and the ESD protection circuitry of the power/ground I/O cell 408 connected to the ground rail 412 may include a fourth rail resistance represented by a fourth resistor R4.

When the ESD event occurs on the first external connection PAD1(+), the first ESD diode D1 may become forward biased and ESD current generated from the ESD event may flow through the first ESD diode D1 to the power rail 410. The ESD current may continue to flow along the portion of the power rail 410 in between the first ESD diode D1 and the clamp transistor M1. The trigger circuitry 414, having detected the ESD event, may turn on the clamp transistor M1, and so the ESD current may then flow through the clamp transistor M1 to the ground rail 412. The fourth ESD diode D4 may also be forward biased in response to the ESD event, and the ESD current may flow along the portion of the ground rail 412 in between the clamp transistor M1 and the fourth ESD diode D4, through the fourth ESD diode D4, to the second external connection PAD2(−), where the ESD current is discharged.

The amount of ESD current that the ESD protection circuitry can discharge may depend on the rail resistance of the ground and power rails—the less resistance, the more current that can be discharged through the discharge path 402. In addition, the amount of rail resistance may depend on the number of lateral metal connections or rails that are connected in parallel. For example, the more lateral metal connections of the portion of the power rail 410 between the first ESD diode D1 and the ESD protection circuitry of the power/ground I/O cell 408 that are connected in parallel, the lower the rail resistance R1 for that portion. Accordingly, the more metal layers that are available for forming parallely connected metal connections, the more metal rails that may be connected in parallel to lower the rail resistance. Further, for some example configurations, the lateral rails in higher metal layers may have lower resistivity, such as on the order of 6-7 times lower resistivity, than lateral rails disposed in lower metal layers, further contributing to the desire to use lateral rails in higher metal layers to lower or minimize the rail the resistance.

Figure 5:
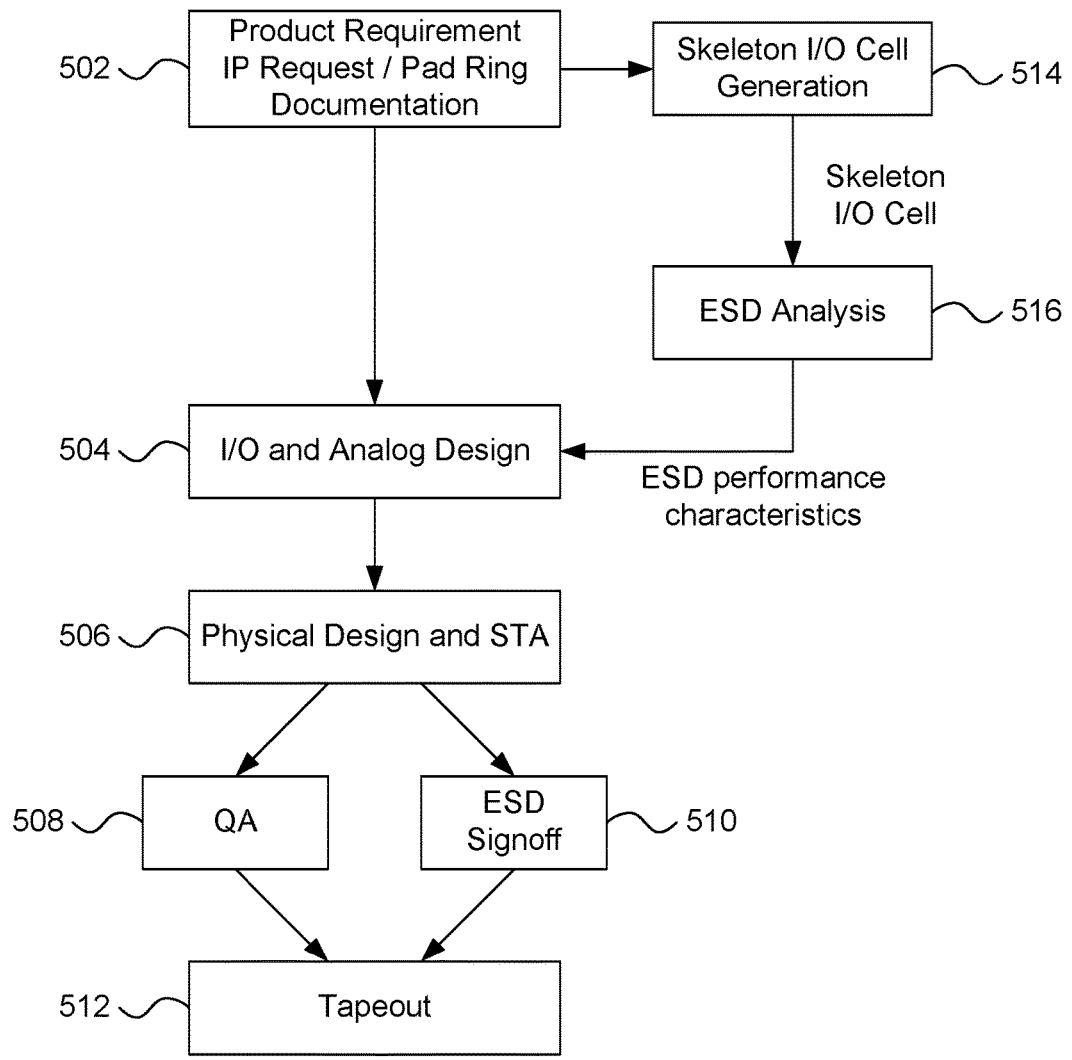
FIG. 5 is a flow chart of an example design flow of an integrated circuit.

FIG. 5 is a flow chart of an example design flow for the design of an integrated circuit, such as the integrated circuit 100 of FIG. 1. A first stage of the design flow may be a product requirement and intellectual property (IP) request and pad ring documentation stage 502. In this first stage 502, top-level product requirement information may be generated for the integrated circuit. For example, the integrated circuit may be decomposed into a number of functional blocks (e.g., the I/O blocks (double data rate (DDR), clock (CLK), power, ground, etc.) and analog circuit blocks (e.g., phase locked loop (PLL) circuits, oscillator circuits, regulator circuits (e.g., low drop out regulators (LDOs), delay locked loop (DLL) circuits, etc.). In some example design flows, information associated with the I/O functional blocks may be compiled into and/or used to generate pad ring documentation, which may include information identifying the characteristics of the I/O cells of the integrated circuit.

After the product requirement and IP request and pad ring documentation stage 502, the design flow may proceed to an I/O and analog design stage 504. In the I/O and analog design stage 504, the circuit schematic design of the I/O cells and analog circuitry of the integrated circuit may be designed and generated using the information from the first stage 502, such as with circuit schematic software being executed by one or more computing devices. The circuit schematic design of the I/O cells may include circuit schematic design of functional circuitry of the I/O cells, such as driver, pre-driver, and level shifter circuitry. The circuit schematic design of the I/O cells may also include circuit schematic design of ESD protection circuitry. In addition, as explained in further detail below, in some example design flows, circuit schematics of ESD protection circuitry generated during a skeleton I/O cell generation stage 514 may be re-generated, modified, or re-designed, or at least a determination of whether to re-generate, modify, and/or re-design the circuit schematics of the ESD protection circuitry, may be performed during the I/O and analog design stage 504. The analog circuitry of the integrated circuit may include one or more regulators that provide one or more regulated supply voltages to the core of the integrated circuit, one or more clock generators that generate and provide one or more clock signals to the core, process-voltage-temperature (PVT) circuitry, analog test circuitry, charge pumps, pre-regulators, and/or other types of analog circuits, as non-limiting examples. Additionally, the circuit schematics generated by the end of the I/O and analog design stage 504 may be a complete circuit schematic design of the I/O cells of the integrated circuit.

Additionally, during the I/O and analog design stage 504, physical layouts of the I/O cells and the analog circuits may be designed and generated, such as with physical layout software being executed by one or more computing devices. The physical layouts may describe the physical characteristics and attributes of the I/O cells and the analog circuits. Additionally, the physical layout of the I/O cells generated during the I/O and analog design stage 504 may be a complete physical layout of the I/O cells, such as one that includes physical layouts of the functional circuitry as well as the physical layouts of the ESD protection circuitry and the rails. Generation of the complete physical layout of the I/O cells may include incorporating one or more skeleton I/O cell physical layouts generated during the skeleton I/O cell generation stage 514 (described in further detail below) into a workspace for designing and generating the complete physical layout of the I/O cells.

After the I/O and analog design stage 504, a physical design (PD) and static timing analysis (STA) stage 506 may be performed. The physical design portion may include integrating together the circuit schematics and/or the physical layouts of the different portions of the integrated circuit, such as for the analog circuitry and the I/O cells. In other design flows, the physical layouts of the analog circuitry and the I/O cells may be designed and generated during the physical design and STA stage 506 instead of the I/O and analog design stage 504. The STA analysis may determine the robustness of the integrated circuit and measure the ability of the components of the integrated circuit to operate at specified speeds and associated delay of the components while operating.

After the physical design and STA stage 506, a quality analysis (QA) stage 508 and an ESD signoff stage 510 may be performed. As shown by the dual arrows, the QA 508 stage and the ESD signoff stage 510 may be performed concurrently or in parallel with each other upon completion of the physical design and STA sage 506. During the QA stage 508, a design rule check (DRC) may be performed to identify whether the layout conforms to design rules associated with the technology of the integrated circuit. Other tests or checks may be performed during the QA stage 508, such as a layout versus schematic test, for example. During the ESD signoff stage 510, an analysis may be performed to determine whether the integrated circuit is ESD compliant, such as whether the ESD protection circuitry meets certain predetermined ESD performance requirements. After the QA stage 508 and the ESD signoff stage 510 are performed, the design flow may proceed to a tapeout stage 512, which may be a final stage of the design flow during which a photomask of the integrated circuit may be generated and/or other associated actions are performed for manufacture of the integrated circuit.

Referring back to the first stage 502, after that stage is performed, a skeleton I/O cell generation stage 514 and an ESD analysis stage 516 may be performed concurrently and/or in parallel with at least a portion of the I/O and analog design stage 504. In the skeleton I/O cell generation stage 514, information identifying and/or characterizing ESD protection circuitry and rails of the I/O cells of the integrated circuit may be generated. Information associated with the I/O cells generated and/or identified during the product requirement and IP request and/or included in the pad ring documentation during the first stage 502 may be used to generate and/or included as part of the information identifying and/or characterizing the ESD protection circuitry and rails of the I/O cells.

During the skeleton I/O generation stage 514, the general or overall characteristics of the I/O cells may be determined, such as how many I/O cells will be included in the integrated circuit and/or in the formation of the I/O pad ring, if not already identified during the first stage 502. An order, sequence, and/or positioning of the I/O cells in the I/O pad ring may also be determined (if not determined during the first stage 502), including which of the I/O cells are signal I/O cells, power I/O cells, and ground I/O cells.

In some design flows, the information identifying and/or characterizing the ESD protection circuitry and rails of the I/O cells may include one or more circuit schematics of the ESD protection circuitry and/or the rails, which may be generated with circuit schematic design software loaded into and/or executed by a computing device. For example, the circuit schematic may identify signal I/O cells as including ESD diodes connected to a bond pad, such as shown for signal I/O cells 404, 406 in FIG. 4, and power/ground I/O cells as including clamp transistors and certain trigger circuitry, such as the clamp transistor M1 and the trigger circuitry 414 in FIG. 4. The circuit schematic may also identify rail connections between the various components of the ESD protection circuitry.

Figure 6:
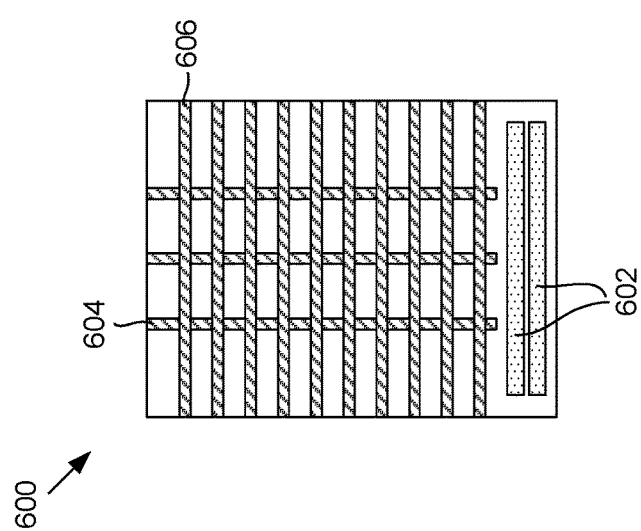
FIG. 6 is a top view of an example skeleton I/O cell physical layout.

In addition or alternatively, the information identifying and/or characterizing the ESD protection circuitry and rails of the I/O cells may include a physical layout of the ESD protection circuitry and the rails, which may generated with layout design software loaded into and/or executed by a computing device. FIG. 6 shows a top view of an example physical layout 600 of ESD protection circuitry and rails of an I/O cell. As shown in FIG. 6, the physical layout may include physical representations of ESD protection circuit components 602, which may be representative of ESD diodes or clamp transistors, for example. The physical layout may also include vertical rails 604 and/or lateral rails 606. Although not shown, other metal components, such as vias and/or pad connections in top or upper metal layers, may also be included in the physical layout. The physical layout may identify the three-dimensional positioning of the ESD protection circuit and rail components of the I/O cells. For example, the physical layout may identify which metal layer in which each of the vertical rails 604 and lateral rails 606 are located. The physical layout may also identify other physical characteristics, such as the materials of the ESD protection circuit components and the rails, and/or the sizes of the ESD protection circuit components and the rails. Generally, any information identifying the physical characteristics or attributes of the ESD protection circuitry and rails may be included in the physical layout information associated with the physical layout 600 shown in FIG. 6.

The physical layout 600 of the ESD protection circuitry and the rails may be referred to as a skeleton I/O cell layout because it does not include layout information pertaining to functional circuitry of the I/O cells. Similarly, a skeleton I/O cell circuit schematic may be a circuit schematic of circuitry of I/O cells that does not include the circuit schematic information pertaining to the functional circuitry. In general, a skeleton I/O cell may include circuit schematic information, physical layout information, or a combination thereof of one or more I/O cells that excludes the functional circuitry aspects of the I/O cells. As previously described, functional circuitry of the I/O cells may include circuitry configured to generate and/or communicate signals between the core and the external pins of the packaging of the integrated circuit, such as driver, pre-driver, and level shifter circuitry as examples. Otherwise stated, a skeleton I/O cell may include circuit schematic and/or layout information pertaining to ESD protection circuitry and rails but not functional circuitry. Such a skeleton I/O cell may be in contrast to an I/O cell generated during the I/O analog and design phase 504, which may include information pertaining to the functional circuitry.

After the information identifying and/or characterizing the ESD protection circuitry and the rails of the I/O cells is generated at the skeleton I/O cell generation stage 514, it may be used in an ESD analysis stage 516. During the ESD analysis stage 516, a computing device executing ESD analysis software may perform ESD analysis on the information identifying and/or characterizing the ESD protection circuitry and the rails. For example, the information may be provided as an input to the ESD analysis software. In some example design flows, information identifying both the circuit schematic and the physical layout of the I/O cells may be analyzed by the computing device for the ESD analysis. Alternatively, the information corresponding to the physical layout but not the circuit schematic of the I/O cells may be analyzed during the ESD analysis stage 516. Information identifying and/or characterizing the ESD protection circuitry and the rails of the I/O cells of the I/O cells other than the circuit schematic and physical layout may also be possible. What information is utilized in the ESD analysis stage 516 and/or provided from the skeleton I/O cell generation stage 501 to the ESD analysis stage 516 may depend on the computing device performing the ESD analysis and/or the ESD analysis software being run on the computing device. In some example configurations, a computing device generating the information corresponding to the physical layout of the ESD protection circuitry and the rails of the I/O cells may convert the information into a data file formatted according to a Graphic Database System (GDS) format as an example, although other formats may be possible. The computing device performing the ESD analysis, which may be the same as or different than the computing device performing the skeleton I/O cell generation, may access the data file to perform the ESD analysis. Various ways of utilizing information identifying and/or characterizing ESD protection circuitry and rails of I/O cells to perform an ESD analysis may be possible.

Upon performing the ESD analysis on the information, the computing device may determine one or more performance characteristics of the ESD protection circuitry. One example performance characteristic may be resistance of a discharge path associated with the ESD protection circuitry. The resistance may include rail resistances of rails between two nodes of the ESD protection circuitry, such as rail resistances R1, R2, R3, or R4 shown in FIG. 4. In addition or alternatively, the resistance may include path resistance, which may be a total resistance of a discharge path, such as the path resistance between PAD1(+) and PAD2(−2) in FIG. 4.

The resistances determined during the ESD analysis stage 516 may include one or more of the various different resistances associated with one or more discharge paths of the I/O cells. For example, a certain I/O cell configuration, such as an I/O pad ring configuration, identifying the number of I/O cells and their associated types determined during the product requirement and IP request and pad ring documentation stage 502 and/or the skeleton I/O cell generation stage 504 may define a plurality of ESD discharge paths formed by various combinations of the I/O cells of the I/O cell configuration. The computing device performing the ESD analysis may determine at least one resistance associated with at least one of the discharge paths formed by the various combinations.

Performance characteristics of the ESD protection circuitry other than resistance may be determined during the ESD analysis stage 516 may be possible. For example, current density associated with the various discharge paths may be another or alternative performance characteristic determined during the ESD analysis stage 516.

As shown in the design flow of FIG. 5, the I/O and analog design stage 504 and/or the physical design and STA stage 506 may utilize the ESD performance characteristics determined during the ESD analysis stage 516. In particular, the design of the ESD protection circuitry may be optimized for performance during the I/O and analog design stage 504 and/or the physical design and STA stage 506 based on the performance characteristics generated from the skeleton I/O cell information during the ESD analysis stage 516. For example, a certain path resistance or rail resistance being higher than desired, as determined from the ESD analysis, may indicate to increase the number of rails and/or metal layers in order to decrease the resistance. Similarly, a certain path resistance or rail resistance being lower than an acceptable value may indicate that the resistance can be increased. Accordingly, a number of rails or metal layers may be reduced, which in turn may reduce the size or amount of space designated for the ESD protection circuitry. In addition or alternatively, the performance characteristics may indicate to add additional I/O cells of a certain type to the I/O cell configuration or to remove I/O cells from the I/O cell configuration. Other design indications may be provided from the performance characteristics. In general, the ESD performance characteristics generated during the ESD analysis stage 516 generated before the I/O and analog design stage 504 or the physical design and STA stage 506 has been completed. In either of these stages 504, 506, the ESD performance characteristics may be utilized in the I/O and analog design stage 504 and/or the physical design and STA stage 506 to determine whether to modify the circuit design and/or the physical layout of the ESD protection circuitry and the rails in order to optimize for ESD performance.

In other design flows, the ESD analysis stage 516 may be grouped or combined with the ESD signoff stage 510 and occur after the physical design and STA stage 506 and right before the final tapeout stage 512. When positioned in the design flow after the physical design and STA stage 506, the ESD analysis may be performed using a complete physical layout of the I/O cells—i.e., a physical layout of the ESD protection circuitry, the rails, and the functional circuitry. If the ESD analysis indicates that a redesign or modification of the ESD protection circuitry should be made, then the design flow may proceed back to the I/O and analog design stage 504 and/or the physical design and STA stage 506. Doing so could delay proceeding to the tapeout stage 512 on the order of weeks of months. If delaying the schedule is prohibitive, then modifying the design of the ESD protection circuitry is not possible and risk with regard to ESD performance is assumed.

In order to be proactive against the possible unsatisfactory results of the ESD analysis, the ESD protection circuitry may be over-designed. For example, the design of the ESD protection circuitry may include extra material or extra rails in order to ensure that the path resistance is sufficiently low. Alternatively, if the ESD protection circuitry is not over-designed, the path resistance may not be as low as it could be. In general, performing the ESD analysis toward the end of the design flow in between the physical design and STA stage 506 and the tapeout stage 512 greatly limits the ability to optimize the design of the ESD protection circuitry without incurring substantial delay in the overall design flow.

In contrast, the design flow of FIG. 5 positions the ESD analysis earlier in the process so that performance characteristics generated from the ESD analysis can be used in the initial designing of the I/O cells and integration with the remaining components of the integrated circuit at stages 504 and 506. This is accomplished by generating skeleton I/O cells that exclude the circuit schematic and/or physical layout information of the functional circuitry of the I/O cells. As perspective, a skeleton I/O circuit schematic and physical layout of the I/O cells can be designed and generated on the order of days, whereas generating a complete I/O circuit schematic and physical layout may take on the order of 2-4 months. In other words, generating additional skeleton I/O cell circuit schematics and/or physical layouts may have minimal impact on the schedule of the design flow. Accordingly, generating skeleton I/O cells and using that information to perform ESD analysis before the full design of the I/O cells is complete (i.e., while the initial designing of the complete I/O cells is underway) may allow the design of the ESD protection circuitry to be optimized while incurring an insignificant or negligible amount of delay.

Figure 7:
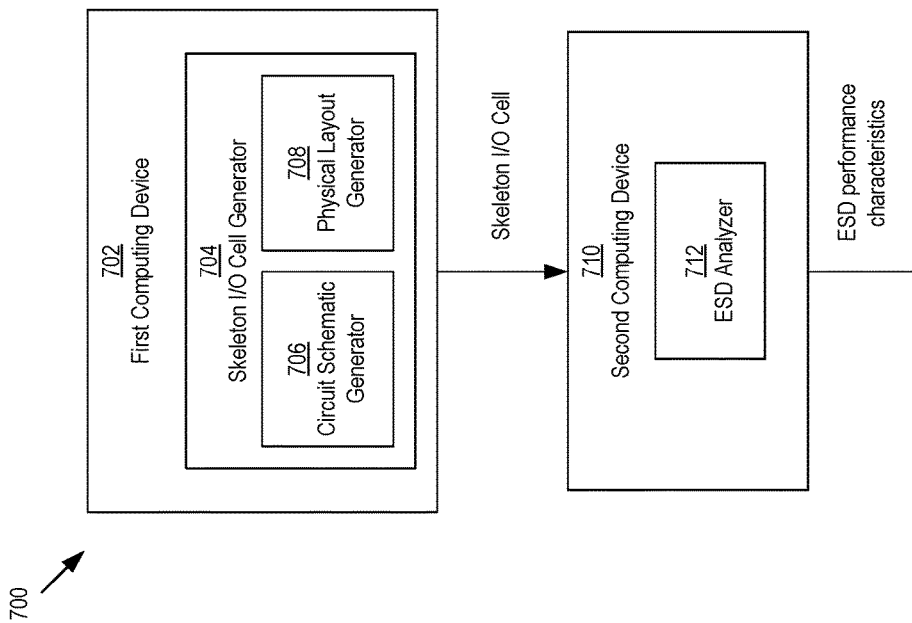
FIG. 7 is a block diagram of an example system configured to generate and analyze skeleton I/O cell information.

FIG. 7 shows a block diagram of an example electronic system 700 that is configured to generate information identifying and/or characterizing the ESD protection circuitry and rails of the I/O cells (e.g., the skeleton I/O cells) and analyze the information to generate ESD performance characteristics. The system 700 may include a first computing device or apparatus 702 configured to generate the skeleton I/O cell information. For example, the first computing device 702 may include a skeleton I/O cell generation module 704, which may include a circuit schematic generation sub-module 706 configured to generate a circuit schematic portion of the skeleton I/O cell information and a physical layout generation sub-module 708 configured to generate a physical layout portion of the skeleton I/O cell information. The system 700 may also include a second computing device or apparatus 710 that includes an ESD analysis module 712 configured to receive and analyze the skeleton I/O cell information and generate ESD performance characteristics associated with ESD circuitry identified and/or characterized by the skeleton I/O cell information.

The modules of the system 700, including the skeleton I/O cell generation module 704, the circuit schematic generation sub-module 706, the physical layout generation sub-module 708, and the ESD analysis module 712, may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises and/or has stored therein instructions executable with a processor or processor circuitry to implement one or more of the features of the module. When any one of the module includes the portion of the memory that comprises or has stored therein instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

Additionally, the first computing device 702 and the second computing device 710 may be the same computing device or different computing devices. In addition or alternatively, one or both of the computing devices 702, 710 may include a plurality of computing devices. Also, the ESD analysis module 712 may receive and/or access the skeleton I/O cell information upon the information being generated by the skeleton I/O cell generation module 704 in any number of different ways. For example, the skeleton I/O cell generation module 704 may store the skeleton I/O cell information in memory, either locally or remotely from the first computing device 702, and the ESD analysis module 712 may be configured to access or retrieve the stored information. Also, after the ESD analysis module 712 generates the ESD performance characteristics, the second computing device 710 may output the ESD performance characteristics, such as using a display, and/or may store the ESD performance characteristics in memory, such as in the form of a data file.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

We claim:

1. A method comprising:
   generating, with a first computing device, data comprising a first physical layout of a plurality input/output (I/O) cells of an integrated circuit in a skeleton form independent from a second physical layout of the plurality of I/O cells that includes functional circuitry of the plurality of I/O cells, wherein the plurality of I/O cells in the skeleton form comprises electrostatic discharge (ESD) protection circuitry and rails but not the functional circuitry of the I/O cells of the integrated circuit;
   performing, with a second computing device executing ESD analysis software, an ESD analysis on the data comprising the first physical layout of the plurality of I/O cells in the skeleton form; and
   in response to performing the ESD analysis, generating, with the second computing device executing the ESD analysis software, at least one performance characteristic of the ESD circuitry based on the data.

2. The method of claim 1, wherein the data identifying the first physical layout is formatted according to a Graphic Database System (GDS) format.

3. The method of claim 1, wherein the at least one performance characteristic comprises a resistance of a discharge path associated with the ESD circuitry.

4. The method of claim 1, wherein the plurality of I/O cells are part of an I/O pad ring of the integrated circuit.

5. The method of claim 1, further comprising:
   inputting the data to ESD analysis software being executed by the second computing device,
   wherein generating the at least one performance characteristics comprises generating, with the second computing device executing the ESD analysis software, the at least one performance characteristic in response to inputting the data to the ESD analysis software.

6. The method of claim 1, wherein the first computing device and the second computing device are the same computing device.

7. The method of claim 1, wherein the first computing device and the second computing device are different computing devices.

8. A method comprising:
   generating, with a first computing device, a data file for a plurality of input/output (I/O) cells of an integrated circuit independent from a first physical layout of the plurality of I/O cells that includes functional circuitry of the plurality of I/O cells of the integrated circuit, wherein the data file comprises a second physical layout of the plurality of I/O cells that includes information of electrostatic discharge (ESD) circuitry of the plurality of I/O cells and that excludes information of functional circuitry of the plurality of I/O cells;
   analyzing, with a second computing device executing electrostatic discharge (ESD) analysis software, the data file comprising the second physical layout of the plurality of I/O cells; and
   based on the analysis, generating, with the second computing device executing the ESD analysis software, at least one performance characteristic of ESD circuitry of the integrated circuit.

9. The method of claim 8, wherein the data file comprises data that identifies ESD protection circuitry and rails of the plurality of I/O cells.

10. The method of claim 8, wherein the data file comprises a layout data file.

11. The method of claim 8, wherein the at least one performance characteristic comprises a rail resistance or a path resistance associated with the ESD circuitry.

12. The method of claim 8, wherein the plurality of I/O cells are part of an I/O pad ring of the integrated circuit.

13. The method of claim 8, wherein the first computing device and the second computing device are the same computing device.

14. The method of claim 8, wherein the first computing device and the second computing device are different computing devices.

* * * * *